(12) United States Patent
Dolby et al.

(10) Patent No.: US 9,236,935 B2
(45) Date of Patent: Jan. 12, 2016

(54) SYSTEM AND METHOD FOR DATA TRANSMISSION

(71) Applicant: Quortus Limited, Guildford, Surrey (GB)

(72) Inventors: Riki Benjamin Dolby, Hook (GB); Andrew James Odgers, Wimbledon (GB)

(73) Assignee: QUORTUS LIMITED, Guildford, Surrey (GB)

( * ) Notice: Subject to any disclaimer, the term of this patent is extended or adjusted under 35 U.S.C. 154(b) by 183 days.

(21) Appl. No.: 13/860,210

(22) Filed: Apr. 10, 2013

(65) Prior Publication Data

US 2014/0307619 A1 Oct. 16, 2014

(51) Int. Cl.
*H04B 7/185* (2006.01)
*H04W 76/02* (2009.01)
*H04W 76/04* (2009.01)

(52) U.S. Cl.
CPC ......... *H04B 7/18513* (2013.01); *H04W 76/022* (2013.01); *H04W 76/041* (2013.01)

(58) Field of Classification Search
CPC .................. H04B 7/18582; H04B 7/18584
See application file for complete search history.

(56) References Cited

U.S. PATENT DOCUMENTS

| 8,457,138 B1* | 6/2013 | Boling ............... H04L 47/2491 370/230 |
| 2003/0126294 A1 | 7/2003 | Thorsteinson et al. |
| 2004/0225691 A1* | 11/2004 | Hirao .................... G06F 3/0605 |
| 2005/0013262 A1 | 1/2005 | Zein Al-Abedeen et al. |
| 2009/0034416 A1 | 2/2009 | Baron et al. |
| 2011/0194491 A1 | 8/2011 | Guemes Cabrejas et al. |
| 2011/0235595 A1* | 9/2011 | Mehta .................. H04W 8/082 370/329 |

OTHER PUBLICATIONS

Written Opinion and International Search Report for Application No. PCT/GB2014/051040 dated Jul. 24, 2014.

* cited by examiner

*Primary Examiner* — Andrew Lai
*Assistant Examiner* — Zhiren Qin
(74) *Attorney, Agent, or Firm* — Fitch, Even, Tabin & Flannery, LLP

(57) ABSTRACT

The present application relates to a system and method for data transmission. The system includes a transmitter for transmitting user data over a transmission link in a format in which the user data is adapted to suit the properties of the transmission link. On the transmit side, an input data stream in a tunnelled format containing the user data to be transmitted is received, and a breakout device is operative to extract the user data from the input data stream and to output the extracted user data to the transmitter, which transmits the user data in the adapted format. On the receive side, a capture device receives the transmitted user data and re-formats the received user data into an output data stream in the tunnelled format, such that the output data stream from the capture device resembles the input data stream to the breakout device.

13 Claims, 3 Drawing Sheets

SYSTEM AND METHOD FOR DATA TRANSMISSION

TECHNICAL FIELD

The present application relates to a system and method for data transmission, and to devices for use in such a system and method.

BACKGROUND TO THE INVENTION

Telecommunications networks pass user data such as voice and data traffic between a source device and a destination device. Often data transmitted from the source device to the destination device is in the form of Internet Protocol (IP) data packets, although data to be transmitted may take a wide variety of other forms.

Many telecommunications networks, including mobile telecommunications networks, employ a tunnelling protocol for transmission of user data between network elements such as the source and destination devices. In tunnelling protocols user data is encapsulated within other data that is being transmitted from one network element to another.

Satellite communications systems can be used to provide both voice and data services to remote locations. In transmitting user data such as voice and data signals, a satellite transmission terminal manipulates the user data to adapt or optimise it to suit the characteristics of the satellite service being used to transmit the user data. For example, voice traffic may be compressed, whilst data packets may be manipulated to make the best possible use of space segment data frames provided by the satellite service.

Mobile telecommunications services can be provided using satellite systems for the backhaul connection. Indeed, in principle any network link between two network elements could be implemented using a satellite connection. An example of this principle is illustrated in FIG. 1, which shows, in schematic form, part of a telecommunications system which uses a satellite connection. In the system illustrated generally at 10 in FIG. 1, a Radio Network Controller (RNC) 12 of a mobile telecommunications network transmits user data, such as voice and data traffic, to a satellite transmission terminal 14. The satellite transmission terminal 14 transmits the voice and data traffic, via a satellite link 16, to a satellite ground station 18. The satellite ground station 18 transmits the received voice and data traffic to further network elements of the telecommunications network such as a serving GPRS support node (SGSN) 20, which receives the data traffic and a Mobile Switching Centre (MSC) 22, which receives the voice traffic.

There are disadvantages in using a satellite system, such as high latency, low bandwidth availability and high costs. The optimisation capabilities of satellite terminals discussed above are designed to offset some of these disadvantages.

However, in most cases the optimisation capabilities of satellite terminals function only on basic voice and data packets. If data presented to the satellite transmission terminal is in a tunnelled format in which the user data (e.g. voice and data traffic) is carried as a payload within a tunnel of other IP data packets to be transmitted, the optimisation capabilities of the satellite transmission terminal operate only on the outer tunnel (i.e. the "other" IP data packets to be transmitted) without affecting the payload of user data.

Additionally or alternatively, traffic within a telecommunications network, whether or not the telecommunications network employs a satellite link, may be handled with different quality of service profiles, and thus treated differently within the network depending on these profiles. However, quality of service based treatments of traffic can only operate on basic voice and data packets, and so such treatment is not effective when the traffic to be transmitted is tunnelled or embedded within other traffic to be transmitted.

SUMMARY OF INVENTION

The present application relates to a system and method for data transmission. The system includes a transmitter for transmitting user data over a transmission link in a format in which the user data is adapted to suit the properties of the transmission link. On the transmit side, an input data stream in a tunnelled format containing the user data to be transmitted is received, and a breakout device is operative to extract the user data from the input data stream and to output the extracted user data to the transmitter, which transmits the user data in the adapted format. On the receive side, a capture device receives the transmitted user data and re-formats the received user data into an output data stream in the tunnelled format, such that the output data stream from the capture device resembles the input data stream to the breakout device.

In this context, the term "tunnelled data stream" refers to a data stream that carries user data in a form that is embedded or hidden within other traffic to be transmitted.

According to a first aspect of the invention, there is provided a system for transmission of data from a source device to a destination device over a transmission link, the system comprising a transmit side and a receive side, wherein the transmit side comprises: a transmitter for transmitting user data over the transmission link, the transmitter being configured to transmit the user data in a format in which the user data is adapted to suit the properties of the transmission link; and a breakout device for receiving at an input thereof a data stream in a tunnelled format containing the user data to be transmitted, the breakout device being configured to extract the user data from the input tunnelled data stream and to output the extracted user data to the transmitter for transmission in the adapted format, and wherein the receive side comprises: a receiver for receiving the user data transmitted by the transmitter; and a capture device for receiving at an input thereof the user data received by the receiver, the capture device being configured to re-format the received user data into an output data stream in the tunnelled format, such that the output data stream resembles the input data stream input to the breakout device.

The system of the first aspect enables "raw" user data to be extracted from an input tunnelled data stream (i.e. a data stream in which the user data to be transmitted is embedded or hidden within other traffic to be transmitted) and transmitted to the transmitter in a format in which the adaptation capabilities of the transmitter can be used to adapt the user data to suit the properties of the transmission link used to transmit the user data between the transmit side and the receive side. In this way, the user data can be optimised for the particular transmission link employed. On the receive side, the raw user data transmitted is re-packaged into a tunnelled format that is expected by downstream network elements. Thus, the system of the first aspect combines the advantages of tunnelled user data with adaptation or optimisation of the user data to the particular transmission link employed in a manner that is seamless and transparent to network elements upstream of the transmitter and downstream of the receiver.

The breakout device may be further configured to receive a signalling message intended for an upstream network element in the transmit side of the system.

The breakout device may be further configured to modify the signalling message such that data subsequently transmitted by the upstream network element is addressed to the breakout device, and to transmit the modified signalling message to the upstream network element.

The breakout device may be configured to modify the signalling message by replacing destination information in the signalling message with information identifying the breakout device.

The signalling message may be a used to set up, modify or tear down a tunnel containing user data.

The capture device may be further configured to receive a signalling message intended for a downstream network element in the receive side of the system.

The capture device may be further configured to modify the signalling message such that data subsequently transmitted by the downstream network element is addressed to the capture device, and to transmit the modified signalling message to the downstream network element.

The capture device may be configured to modify the signalling message by replacing destination information in the signalling message with information identifying the capture device.

The signalling message may be used to set up, modify or tear down a tunnel containing user data.

The breakout device may be further configured to modify the extracted user data to cause the extracted user data to be routed to the capture device.

The capture device may be configured to modify the user data received at its input to cause the received user data to be routed to its original destination.

The breakout device may be further configured to generate a unique data stream identifier for a stream of user data received by the breakout device, and to replace information in the user data identifying a destination port with the unique data stream identifier for the stream of user data.

The breakout device may be further configured to generate a mapping between the unique data stream identifier for the received user data stream and a unique unused destination port identifier, and to transmit information relating to the mapping to the capture device.

The unique data stream identifier may comprise a unique system identifier of the breakout device and a stream identifier generated by the breakout device.

The capture device may be configured to compare the unique stream identifier in the user data received at its input to the mapping information received from the breakout device to identify a received user data stream identified by the unique stream identifier, to recover the identified user data stream and to re-format the identified received user data stream into the an output data stream in the tunnelled format.

According to a second aspect of the invention there is provided a breakout device for use in a system according to the first aspect, the breakout device having an input for receiving a data stream in a tunnelled format, the tunnelled data stream containing user data to be transmitted, wherein the breakout device is configured to extract the user data from the input tunnelled data stream and to output the extracted user data.

According to a third aspect of the invention there is provided a capture device for use in a system according to the first aspect, the capture device having an input for receiving user data, the capture device being configured to re-format the received user data into an output data stream in a tunnelled format.

According to a fourth aspect there is provided a method for transmitting data from a source device to a destination device over a transmission link, the method comprising: receiving an input data stream in a tunnelled format, the data stream containing user data to be transmitted; extracting the user data from the received tunnelled data stream; transmitting user data over the transmission link in a format in which the user data is adapted to suit the properties of the transmission link; receiving the user data transmitted by the transmitter; and re-formatting the received user data into an output data stream in the tunnelled format, such that the output data stream resembles the input data stream input.

BRIEF DESCRIPTION OF THE DRAWINGS

Embodiments of the invention will now be described, strictly by way of example only, with reference to the accompanying drawings, of which.

DESCRIPTION OF THE EMBODIMENTS

Figure 1:
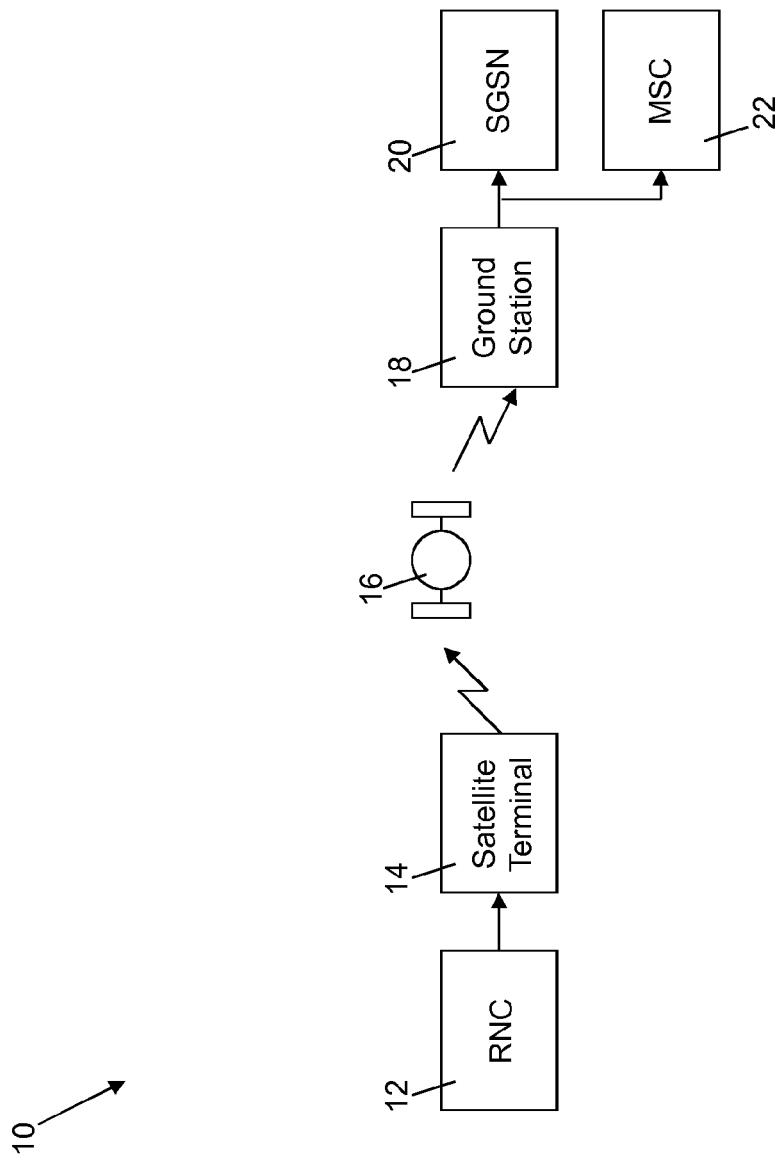
FIG. 1 is a schematic representation showing part of a mobile telecommunications system which uses a satellite link.
Figure 2:
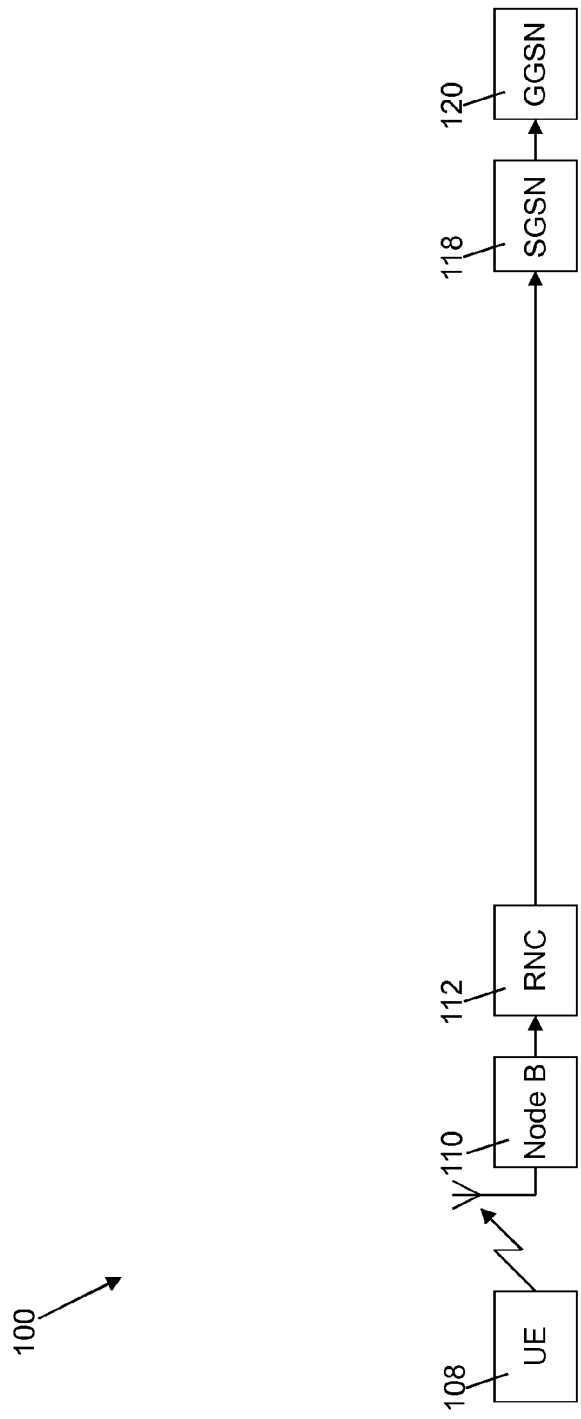
FIG. 2 is a schematic representation of a system for data transmission.

FIG. 2 shows, in schematic form, a system for data transmission. The exemplary system illustrated in FIG. 2 is for data transmission in a third generation (3G) cellular mobile telecommunications network, but it is to be appreciated that the principles described below are equally applicable to any data transmission system.

User data such as voice and data traffic is transmitted by a User Equipment (UE) 108, such as a mobile telephone handset operating in the telecommunications network, to a Node B 110 of the network. The Node B 110 in turn transmits the user data received from the UE 108 to a Radio Network Controller 112 of the network, for onward transmission.

In a typical telecommunications network, as shown generally at 100 in the schematic illustration of FIG. 2, the RNC 112 connects directly to a serving GPRS support node (SGSN) 118 of the telecommunications network via an IuPS interface, in which signalling is performed using a RANAP (Radio Access Network Application Part) signalling protocol, whilst user data is transferred using a GTP-U tunnelling protocol.

Figure 3:
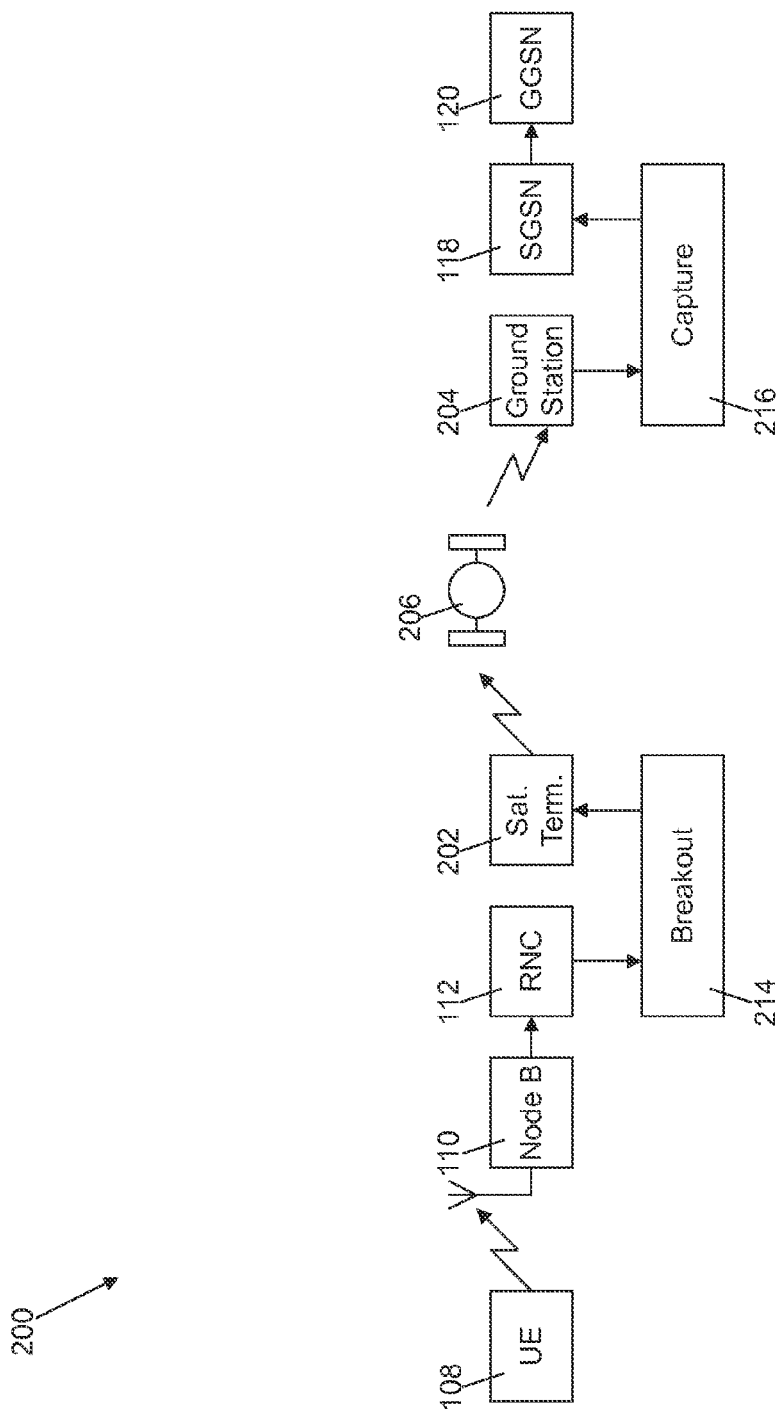
FIG. 3 is a schematic representation of a system for data transmission using a satellite link.

The system shown generally at 200 in FIG. 3 is similar to the system illustrated in FIG. 2, and so the same reference elements have been used to designate features common to the systems of FIGS. 2 and 3. The system illustrated in FIG. 3 differs from that of FIG. 2 in that it includes a satellite transmission terminal 202 and a complementary ground station 204 by means of which user data is transmitted over a satellite link 206.

FIG. 3 is a schematic representation of a system for data transmission using a satellite link. The exemplary system illustrated in FIG. 3 is for data transmission in a third generation (3G) cellular mobile telecommunications network, but it is to be appreciated that the principles described below are equally applicable to any data transmission system. Moreover, it is to be understood that the principles described below do not apply only to systems which use a satellite link, but are applicable to any system in which voice or data traffic to be transmitted is tunnelled or embedded within other traffic.

In the satellite communications system illustrated in FIG. 3 the satellite transmission terminal 202 and the complementary ground station 204 are employed to transmit user data over the satellite link 206. As indicated above, if data presented to the satellite transmission terminal 202 is in a tunnelled format, the optimisation capabilities of the satellite terminal 202 operate only on the outer tunnel without affecting the payload of user data.

Thus, in order to exploit the optimisation capabilities of the satellite transmission terminal 202 to permit the user data to be adapted or optimised to suit the properties of the satellite transmission link 206, the user data must be extracted or "de-tunnelled" from the GTP-U tunnel in which is output by the RNC 112.

To this end, the system 200 includes a breakout device 214, which is configured to receive at its input one or more data streams containing the tunnelled user data and signalling messages from the RNC 112, to extract the user data and to output the extracted user data to the satellite transmission terminal 202 in a format suitable for adaptation (optimisation) and transmission by the satellite transmission terminal 202 over the satellite transmission link 206 to the ground station 204.

Similarly, in order for the user data transmitted over the satellite link 206 to be usable by an SGSN 118 of the system 200, the user data must be transmitted to the SGSN 118 in a format that is expected by the SGSN 118. However, the ground station 204 outputs "raw" user data. To overcome this problem, the system 200 includes a capture device 216, which is configured to receive the raw user data output by the ground station 204 and to re-format the received raw user data into one or more output data streams containing the user data in the tunnelled format expected by the SGSN 118, such that the output data stream(s) resembles the data stream(s) input by the RNC 112 to the breakout device 214.

In order for the breakout device 214 to be usable with existing network equipment without requiring modifications to the existing network equipment, the breakout device 214 must emulate the SGSN 118 for both signalling and traffic purposes, so that the RNC 112 "thinks" that it is connected to the SGSN 118.

Similarly, in order for the capture device 216 to be usable with existing network equipment without requiring modifications to the existing network equipment, the capture device 216 must emulate the RNC 112 for both signalling and traffic purposes, so that the SGSN 118 "thinks" that it is connected to the RNC 112.

This emulation may be achieved, for example, by manipulation of signalling messages which are used in the system 200 to set up, modify or tear down a tunnel containing user data. This concept will be discussed below by reference to an exemplary system in which Radio Access Bearer (RAB) messages are used to set up, modify or tear down a tunnel containing user data. However, it will be appreciated that the concept is equally applicable to systems in which alternative signalling messages are used to set up, modify or tear down tunnels containing user data.

In a telecommunications system that does not use a satellite link, such as the system 100 illustrated in FIG. 2, the SGSN 118 and the RNC 112 exchange RAB assignment and RAB assignment response messages, to establish data tunnels between the SGSN 118 and the RNC 112 for data transfer.

A RAB assignment message is transmitted by the SGSN 118 to the RNC 112. The RAB assignment message includes the IP address to which data transmitted by the RNC 112 should be directed (i.e. the IP address of the SGSN 118) and a tunnel ID indicating the tunnel that should be used when transmitting data from the RNC 112 to the SGSN 118.

The RNC 112 responds to the RAB assignment message with a RAB assignment response message, which includes the IP address to which data transmitted by the SGSN 118 should be directed (i.e. the IP address of the RNC 112) and a tunnel ID indicating the tunnel that should be used when transmitting data from the SGSN 118 to the RNC 112.

RAB assignment and RAB assignment response messages are also used in the system illustrated in FIG. 3. By manipulating these RAB assignment and RAB assignment response messages, the breakout and capture devices 214, 216 used in the system illustrated in FIG. 3 can effectively emulate the RNC 112 and the SGSN 118 for signalling and traffic purposes.

In the system of FIG. 2, a RAB assignment message sent by the SSGN 118 to the RNC 112 includes a number of fields, as indicated below:

| | |
|---|---|
| GTP Destination IP Address | The IP address of the RNC 112 |
| GTP Tunnel Endpoint ID | The ID of the tunnel to use for data transfer from RNC 112 to SSGN 118 |

The GTP Destination IP Address and GTP Tunnel Endpoint ID fields are addressing fields which inform the RNC 112 of the IP address to which data should be directed and of the data tunnel to use when transmitting data.

In the system illustrated in FIG. 3, the RAB assignment message transmitted by the SGSN 118 is received by the capture device 216. The capture device 216 stores the GTP Destination Address and GTP Tunnel ID information from this message, to ensure that the capture device 216 is able to communicate correctly with the SGSN 118, and forwards the RAB assignment message on to the breakout device 214.

When the breakout device 214 receives the RAB assignment message (which is intended for the RNC 112 upstream of the breakout device 214) from the capture device 216, the breakout device 214 modifies the RAB assignment message to replace the original destination information in the RAB assignment message with information identifying the breakout device 214 as the destination for data subsequently transmitted by the RNC 112, to ensure that such future data transmissions are "intercepted" by the breakout device 214 to permit adaptation/optimistation of the user data by the satellite transmission terminal 202.

This is achieved, in the exemplary system shown in FIG. 3, by replacing the GTP Destination Address in the RAB assignment message with the IP address of the breakout device 214, and the GTP Tunnel Endpoint ID with the tunnel endpoint ID selected by the breakout device 214. The breakout device 214 then forwards the modified RAB assignment message on to the RNC 112.

Thus, a RAB assignment message at the interface between the breakout device 214 and the RNC 112 in the exemplary system shown in FIG. 3 will be modified as shown below:

| | |
|---|---|
| GTP Destination IP Address | The IP address of the breakout device 214 |
| GTP Tunnel Endpoint ID | The ID of the tunnel to use for data transfer from RNC 112 to breakout device 214 |

The modified GTP Destination IP Address and GTP Tunnel Endpoint ID in the modified RAB assignment message received by the RNC 112 ensure that the RNC 112 addresses data packets to the breakout device 214, rather than to the SGSN 118. In this way, the breakout device 214 is able to "intercept" data packets transmitted by the RNC 112 and perform the de-tunnelling operation to extract the user data, before transmitting the extracted user data to the satellite transmission terminal 202 in a format suitable for adaptation (optimisation) and transmission by the satellite transmission terminal 102 over the satellite transmission link 106 to the ground station 204.

Similarly, a RAB assignment response message sent by the RNC 112 to the SSGN 118 in the system of FIG. 2 includes a number of fields, as indicated below:

| GTP Destination IP Address | The IP address of the SSGN 118 |
|---|---|
| GTP Tunnel Endpoint ID | The ID of the tunnel to use for data transfer from SSGN 118 to RNC 112 |

The GTP Destination IP Address and GTP Tunnel ID fields are addressing fields which inform the SGSN 118 of the IP address to which data should be directed and of the data tunnel to use when transmitting data from the SGSN 118 to the RNC 112.

In the system illustrated in FIG. 3, on receiving a RAB assignment response message from the RNC 112, the breakout device 214 stores the GTP Destination ID and GTP Tunnel Endpoint ID fields, to ensure that the breakout device 214 is able to communicate correctly with the RNC 112. The breakout device 214 then forwards the RAB assignment response message to the capture device 216.

When the capture device 216 receives the RAB assignment response message (which is intended for the SGSN 118 downstream of the capture device 216), the capture device 216 modifies the RAB assignment response message to replace the original destination information in the RAB assignment response message with information identifying the capture device 216 as the destination for data subsequently transmitted by the SGSN 118, to ensure that such future data transmissions are "intercepted" by the capture device 216.

This is achieved, in the exemplary system illustrated in FIG. 3, by replacing the data in the GTP Destination IP Address field in the RAB assignment response message with the IP address of the capture device 216, and the and GTP Tunnel Endpoint ID with the tunnel endpoint ID of the capture device 216. The capture device 216 then forwards the modified RAB assignment response message to the SGSN 118.

Thus, a RAB assignment response message at the interface between the capture device 216 and the SGSN 118 in the exemplary system shown in FIG. 3 will be modified as shown below:

| GTP Destination IP Address | The IP address of the capture device 216 |
|---|---|
| GTP Tunnel Endpoint ID | The ID of the tunnel to use for data transfer from SGSN 118 to capture device 216 |

The modified GTP Destination IP Address and GTP Tunnel Endpoint ID in the modified RAB assignment response message received by the SGSN 118 ensure that the SGSN 118 addresses data packets to the capture device 216, rather than to the RNC 112.

When the breakout device 214 receives user data for onward transmission from the RNC 112, it must extract the user data from the GTP tunnel in which the user data is transmitted, in order for the user data to be forwarded to the satellite transmission terminal 202 in a format suitable for adaptation (optimisation) and transmission by the satellite transmission terminal 202 over the satellite transmission link 106 to the ground station 204.

A GTP data packet transmitted by the RNC 112 to the breakout device 214 includes key fields as shown below:

| GTP Destination IP Address | The IP address of the breakout device 214 |
|---|---|
| GTP Tunnel Endpoint ID | The ID of the tunnel to use for data transfer from RNC 112 to breakout device 214 |
| Destination IP Address | The IP address of the ultimate destination of the user data |
| Destination Port ID | The ID of the ultimate destination port of the user data |
| Source IP Address | The IP address of the source of the user data |
| Source Port ID | The ID of the source port of the user data |

It will be recalled that the user data includes addressing information stored in the fields Destination IP Address, Destination Port Number, Source IP Address and Source Port Number. These four fields may be regarded as a "quad" which defines a specific user data stream. The breakout device 214 must modify the addressing information of the user data received within the GTP tunnel from the RNC 112 to ensure that the user data is routed to the capture device 216, rather than to the ultimate destination address specified in the original Destination IP Address field.

Thus, the breakout device 214 replaces the information in the Destination IP Address field with the IP address of the capture device 216, which ensures that the user data is routed to the capture device 216. The address in the Source IP Address field of the user data, which is usually the IP address of the UE 108 (the source of the user data), is replaced with the IP address of the breakout device 214, to ensure that return messages are routed to the breakout device 214. Additionally, the information in the Source Port Number field is changed to ensure that the Source Port Number is unique for each outbound traffic stream from the breakout device 214.

If the extracted user data transmitted from the breakout device 214 through the system 100 undergoes any additional network address translation (NAT) functions prior to arriving at the capture device 216, for example where a gateway device is used which provides a single externally visible IP address, but a private address range is used by devices operating downstream of the gateway device, it is likely that the information in the Source Port Number and the Source IP Address fields will be further modified. However, it is also necessary to be able uniquely to identify each user data stream when it arrives at the capture device 216, so that each user data stream can be mapped to the correct RAB context and put back into the correct GTP tunnel for onward transmission to the SGSN 118.

One way of achieving the required unique identification of each user data stream with minimal manipulation of the user data is to replace the information contained in the Destination Port Number field with a unique Stream Identifier generated by the breakout device 214 for each stream of user data to be transmitted.

When the breakout device 214 detects a new stream of user data, for example a TCP connection attempt or a new UDP (User Datagram Protocol) traffic flow, it creates a mapping between a unique unused destination port ID and the quad defining the new user data stream. The breakout device 214 then transmits a control packet to the capture device 216 containing this mapping information, which allows the capture device 216 to identify the user data stream from the modified destination port ID contained in the user data transmitted by the breakout device 214, and so to reconstruct the original user data.

Thus, the data at the interface between the breakout device 214 and the satellite transmission terminal 202 includes the raw user data and a modified quad of addressing information, as follows:

| | |
|---|---|
| Destination IP Address | The IP address of the capture device 216 |
| Destination Port ID | The unique Stream Identifier |
| Source IP Address | The IP address of the breakout device 214 |
| Source Port ID | The port number from which the data stream was transmitted by the breakout device |

The data output by the breakout device 214 is in a de-tunnelled format and so is suitable for adaptation (optimisation) and transmission by the satellite transmission terminal 202.

The ground station 204 receives the user data transmitted by the satellite transmission terminal 202 and routes it based on the modified addressing information. Thus, the user data is routed to the capture device 216, as the destination IP address of the user data received by the ground station 204 is set to the IP address of the capture device 216.

When the user data is received by the capture device 216, the capture device 216 uses the unique Stream Identifier in the Destination Port ID field to identify the stream of user data to be transmitted, by comparing the Stream Identifier to the mapping information received in the control packet from the breakout device 214, and recovers the identified stream of user data. The original destination IP address and destination port ID are entered into the Destination IP Address and Destination Port ID fields respectively, and similarly the original source IP address and source port ID are entered into the Source IP Address and Source Port ID fields.

With the original addressing information for the user data restored, the capture device 216 re-tunnels the user data so that it can be transmitted to the SGSN 118 in a format that will be recognised by the SGSN 118. To this end, the GTP addressing fields are populated with destination information expected by the SGSN 118. The GTP Destination Address field is set to the IP address of the SGSN 118, which was previously stored by the capture device 216 as part of the RAB message manipulation, whilst the GPT Tunnel ID field is set to the previously stored tunnel ID, such that the user data is routed to the correct tunnel of the SGSN 118. Thus, the data at the interface between the capture device 216 and the SGSN 118 will be as shown below:

| | |
|---|---|
| GTP Destination IP Address | The IP address of the SGSN 118 |
| GTP Tunnel Endpoint ID | The ID of the tunnel to use for data transfer from capture device 216 to SGSN 118 |
| Destination IP Address | The IP address of the ultimate destination of the user data |
| Destination Port ID | The ID of the ultimate destination port of the user data |
| Source IP Address | The IP address of the source of the user data |
| Source Port ID | The ID of the source port of the user data |

As can be seen from the above, the data at the interface between the capture device 216 and the SGSN 116 resembles the data at the interface between the RNC 112 and the breakout device 214. It is to be noted that the data at the interface between the capture device 216 and the SGSN 218 only resembles the data at the interface between the RNC 112 and the breakout device 214 as the GTP Destination Address and GTP Tunnel Endpoint ID fields are not identical. However, the user data is received by the SGSN 118 in a format that it recognises, and thus no modifications are required to the SGSN 118 in order to function correctly.

In some circumstances it may be necessary to use multiple breakout devices 214 in conjunction with a single capture device 216, for example where user data from multiple RNCs 112 is to be transmitted using a common satellite link 206. In this case, the capture device 216 will transmit a unique System ID to each breakout device 214. Each breakout device 214 will then construct the Stream IDs from a combination of its own System ID and a locally unique stream identifier. In this way, the capture device 216 is able to identify uniquely each stream from each breakout device 214. In one exemplary system, the System IDs allocated by the capture device 216 to each of the breakout devices 214 may be 8 bits, whilst the locally unique stream identifiers may be 24 bits, such that the Stream IDs constructed by the capture devices are 32 bits in size. This arrangement permits over 16 million unique user data streams to be handled by a single breakout device 216.

It will be appreciated from the foregoing that the breakout device 214 is operative to extract the user data from the tunnelled data stream output by the RNC 112 and present the user data to the satellite transmission terminal in a raw format in which the data can be adapted by the satellite transmission terminal 202 to suit the properties of the transmission link 206. The breakout device 214 operates transparently, without requiring any modification to either the RNC 112 or the satellite transmission terminal, which are standard components.

On the receive side, the capture device 216 is operative to receive the raw user data transmitted over the transmission link 206 from the ground station 204, and to re-format the user data into a tunnelled format which can be used correctly by the SGSN 118. The capture device 216 operates transparently, without requiring any modifications to either the ground station 204 or the SGSN 118, which are both standard components.

In the foregoing description, only "forward" data transmission from the RNC 112 to the SGSN 118 has been described, and the behaviour and operation of the elements of the system 200, in particular the breakout device 214 and the capture device 216, has been described in the context of such forward data transfer. For transmission of data in the "reverse" direction, i.e. from the SGSN 118 to the RNC 112, the behaviour and operation of the components of the system 200 are reversed.

Thus, for the purpose of transmitting data from the SGSN 118 to the RNC 112, the capture device 216 operates as a breakout device 214, to extract the raw user data from the data stream output by the SGSN 118 as described above, and forwards the raw user data to the ground station 204, which adapts the extracted user data to suit the characteristics of the satellite link 206 and transmits the adapted user data to the satellite transmission terminal 202. The satellite transmission terminal 202 transmits the received user data to the breakout device 214, which operates as a capture device 216 as described above, to re-tunnel the user data transmitted by the satellite transmission terminal 202 and output a data stream containing the user data in a tunnelled format that will be recognised by the RNC 112.

The principles of the present invention have been described above in the context of an exemplary system for data transmission in a third generation (3G) cellular mobile telecommunications network. However, it will be appreciated that the principles of the invention are equally applicable to any data transmission system.

Additionally, in the exemplary system described above user data is transferred using a GTP-U tunnelling protocol, in which user data is transmitted separately from signalling data. However, the principles described above are applicable to any protocol that carries user data in a form that is embedded or hidden within other traffic that is to be transmitted. Thus, the term "tunnelled" and related terms such as "de-tunnelled" and "re-tunnelled" are effectively shorthand terms, and should be understood to relate to any protocol that carries user data in a form that is embedded or hidden within other traffic that is to be transmitted, rather than to any specific protocol.

For example, although in the exemplary system described above user data is transferred using a GTP-U tunnelling protocol, it is to be understood that the operation of the breakout device 214 to extract raw user data from a tunnelled data stream, and the operation of the capture device 216, to re-tunnel user data into a tunnelled data stream, also apply to user data transmitted using other protocols, for example protocols in which the user data and signalling data are carried in the same data stream, which itself is embedded (tunnelled) within a stream of other IP data packets.

The breakout device 214 and the capture device 216 are described above as discrete devices which form part of the telecommunications system 200. It is to be appreciated that both the breakout device 214 and the capture device 216 may be implemented as standalone hardware devices, or as hardware devices that may be integrated into other network components such as the RNC 112, satellite transmission terminal 202, ground station 204 or SGSN 118. Alternatively, both the breakout device 214 and the capture device 216 may be implemented as software which, when executed by appropriately configured processing hardware, cause the processing hardware to implement the functionality of the breakout device 214 or the capture device 216.

The invention claimed is:

1. A system for transmission of data from a source device to a destination device over a transmission link, the system comprising a transmit side and a receive side, wherein the transmit side comprises:
    a transmitter which transmits user data over the transmission link, the transmitter being configured to transmit the user data in a format in which the user data is adapted to suit properties of the transmission link; and
    a breakout device which receives a data stream in a tunnelled format containing the user data to be transmitted, the breakout device being configured to extract the user data from the input tunnelled data stream and to output the extracted user data to the transmitter for transmission in the adapted format,
    and wherein the receive side comprises:
    a receiver which receives the user data transmitted by the transmitter; and
    a capture device which receives the user data received by the receiver, the capture device being configured to re-format the received user data into an output data stream in the tunnelled format, such that the output data stream resembles the inputted data stream inputted to the breakout device, wherein:
    the breakout device is further configured to modify the extracted user data to cause the extracted user data to be routed to the capture device;
    the capture device is configured to modify the user data received at its input to cause the received user data to be routed to its original destination; and
    the breakout device is configured to generate a unique data stream identifier for a stream of user data received by the breakout device, and to replace information in the user data identifying a destination port with the unique data stream identifier for the stream of user data.

2. The system according to claim 1 wherein the breakout device is further configured to receive a signalling message intended for an upstream network element in the transmit side of the system.

3. The system according to claim 2, wherein the breakout device is configured to modify the signalling message such that data subsequently transmitted by the upstream network element is addressed to the breakout device, and to transmit the modified signalling message to the upstream network element.

4. The system according to claim 2 wherein the signalling message is used to set up, modify or tear down a tunnel containing user data.

5. The system according to claim 1 wherein the capture device is further configured to receive a signalling message intended for a downstream network element in the receive side of the system.

6. The system according to claim 5 wherein the capture device is configured to modify the signalling message such that data subsequently transmitted by the downstream network element is addressed to the capture device, and to transmit the modified signalling message to the downstream network element.

7. The system according to claim 5 wherein the signalling message is used to set up, modify or tear down a tunnel containing user data.

8. The system according to claim 1 wherein the breakout device is further configured to generate a mapping between the unique data stream identifier for the received user data stream and a unique unused destination port identifier, and to transmit information relating to the mapping to the capture device.

9. The system according to claim 8 wherein the capture device is configured to compare the unique stream identifier in the user data received at its input to the mapping information received from the breakout device to identify a received user data stream identified by the unique stream identifier, to recover the identified user data stream and to re-format the identified received user data stream into an output data stream in the tunnelled format.

10. The system according to claim 1 wherein the unique data stream identifier comprises a unique system identifier of the breakout device and a stream identifier generated by the breakout device.

11. A breakout device in the system according to claim 1, the breakout device having an input which receives a data stream in a tunnelled format, the tunnelled data stream containing user data to be transmitted, wherein the breakout device is configured to extract the user data from the input tunnelled data stream and to output the extracted user data.

12. A capture device in the system according to claim 1, the capture device having an input which receives user data, the capture device being configured to re-format the received user data into an output data stream in a tunnelled format.

13. A method for transmitting data from a source device to a destination device over a transmission link, the method comprising:
    receiving an input data stream in a tunnelled format, the data stream containing user data to be transmitted;
    extracting the user data from the received tunnelled data stream;

modifying the extracted user data to cause the extracted user data to be routed;
generating a unique data stream identifier for a stream of user data and replacing information in the user data identifying a destination port with the unique data stream identifier for the stream of user data;
transmitting the user data over the transmission link in a format in which the user data is adapted to suit properties of the transmission link;
receiving the user data transmitted by the transmitter;
re-formatting the received user data into an output data stream in the tunnelled format, such that the output data stream resembles the input data stream; and
modifying the user data received to cause the received user data to be routed to its original destination.

* * * * *